(12) United States Patent
Burke

(10) Patent No.: US 9,269,208 B2
(45) Date of Patent: *Feb. 23, 2016

(54) REMOTE ENTRY SYSTEM

(75) Inventor: Christopher John Burke, Ramsgate (AU)

(73) Assignee: SECURICOM (NSW) PTY LTD, Ramsgate (AU)

( * ) Notice: Subject to any disclaimer, the term of this patent is extended or adjusted under 35 U.S.C. 154(b) by 78 days.

This patent is subject to a terminal disclaimer.

(21) Appl. No.: 13/572,166

(22) Filed: Aug. 10, 2012

(65) Prior Publication Data

US 2012/0311343 A1 Dec. 6, 2012

Related U.S. Application Data

(63) Continuation of application No. 10/568,207, filed as application No. PCT/AU2004/001083 on Aug. 13, 2004, now Pat. No. 8,266,442.

(30) Foreign Application Priority Data

Aug. 13, 2003 (AU) ................................ 2003904317

(51) Int. Cl.
*H04L 29/06* (2006.01)
*G07C 9/00* (2006.01)
(Continued)

(52) U.S. Cl.
CPC ............ *G07C 9/00158* (2013.01); *G06F 21/32* (2013.01); *G06F 21/35* (2013.01); *H04L 63/0861* (2013.01); *H04W 12/08* (2013.01); *H04W 84/12* (2013.01); *H04W 84/18* (2013.01)

(58) Field of Classification Search
CPC ............................. H04L 63/0861; G06F 21/32

USPC ........................................................ 713/186
See application file for complete search history.

(56) References Cited

U.S. PATENT DOCUMENTS 5,109,428 A * 4/1992 Igaki et al. ..................... 382/125
5,933,515 A * 8/1999 Pu ........................ G06K 9/00006
340/5.53

(Continued)

FOREIGN PATENT DOCUMENTS

WO   WO 0212660 A1 * 2/2002
WO   WO 02/095589 A1  11/2002

OTHER PUBLICATIONS

Notice of Acceptance dated Sep. 18, 2012 for co-pending Australian Patent Office Application No. 2009201293 (3 pp.).

(Continued)

*Primary Examiner* — Mohammad L Rahman
(74) *Attorney, Agent, or Firm* — Brinks Gilson & Lione

(57) ABSTRACT

A system is disclosed for providing secure access to a controlled item, the system comprising a database of biometric signatures, a transmitter subsystem comprising a biometric sensor for receiving a biometric signal, means for matching the biometric signal against members of the database of biometric signatures to thereby output an accessibility attribute, and means for emitting a secure access signal conveying information dependent upon said accessibility attribute, wherein the secure access signal comprises one of at least a rolling code, an encrypted Bluetooth™ protocol, and a WiFi™ protocol, and a receiver sub-system comprising means for receiving the transmitted secure access signal and means for providing conditional access to the controlled item dependent upon said information.

13 Claims, 10 Drawing Sheets

(51) Int. Cl.
*G06F 21/32* (2013.01)
*G06F 21/35* (2013.01)
*H04W 12/08* (2009.01)
*H04W 84/12* (2009.01)
*H04W 84/18* (2009.01)

(56) References Cited

U.S. PATENT DOCUMENTS

| | | | |
|---|---|---|---|
| 6,195,447 B1 * | 2/2001 | Ross | 382/125 |
| 6,229,906 B1 * | 5/2001 | Pu et al. | 382/116 |
| 6,992,562 B2 * | 1/2006 | Fuks et al. | 340/5.52 |
| 7,152,045 B2 * | 12/2006 | Hoffman | 705/43 |
| 7,174,017 B2 * | 2/2007 | Bantz et al. | 380/255 |
| 2002/0038818 A1 | 4/2002 | Zingher et al. | |
| 2003/0126439 A1 | 7/2003 | Wheeler et al. | |
| 2004/0042642 A1 * | 3/2004 | Bolle | G07C 9/00134 382/115 |

OTHER PUBLICATIONS

Extended European Search Report for corresponding EP application No. 14188004 dated Apr. 22, 2015.
Office Action for corresponding Canadian application No. 2,535,434 dated Mar. 27, 2015.

* cited by examiner

REMOTE ENTRY SYSTEM

CROSS-REFERENCE TO RELATED APPLICATIONS

This application is a continuation patent application of U.S. Non-Provisional application Ser. No. 10/568,207 for REMOTE ENTRY SYSTEM, filed Jun. 4, 2008 now U.S. Pat. No. 8,266,442, the disclosure of which is incorporated by reference in its entirety.

FIELD OF THE INVENTION

The present invention relates to secure access systems and, in particular, to systems using wireless transmission of security code information.

BACKGROUND

FIG. 1 shows a prior art arrangement for providing secure access. A user 401 makes a request, as depicted by an arrow 402, directed to a code entry module 403. The module 403 is typically mounted on the external jamb of a secure door. The request 402 is typically a secure code of some type which is compatible with the code entry module 403. Thus, for example, the request 402 can be a sequence of secret numbers directed to a keypad 403. Alternately, the request 402 can be a biometric signal from the user 401 directed to a corresponding biometric sensor 403. One example of a biometric signal is a fingerprint. Other physical attributes that can be used to provide biometric signals include voice, retinal or iris pattern, face pattern, palm configuration and so on.

The code entry module 403 conveys the request 402 by sending a corresponding signal, as depicted by an arrow 404, to a controller 405 which is typically situated in a remote or inaccessible place. The controller 405 authenticates the security information provided by the user 401 by interrogating a database 407 as depicted by an arrow 406. If the user 401 is authenticated, and has the appropriate access privileges, then the controller 405 sends an access signal, as depicted by an arrow 408, to a device 409 in order to provide the desired access. The device 409 can, for example, be the locking mechanism of a secure door, or can be an electronic lock on a personal computer (PC) which the user 401 desires to access.

A proximity card can also be used to emit the request 402, in which case the code entry module 403 has appropriate functionality.

Although the request 402 can be made secure, either by increasing the number of secret digits or by using a biometric system, the communication infrastructure in FIG. 1 is typically less secure. The infrastructure 400 is generally hard-wired, with the code entry module 403 generally being mounted on the outside jamb of a secured door. In such a situation, the signal path 404 can be over a significant distance in order to reach the controller 405. The path 404 represents one weak point in the security system 400, providing an unauthorised person with relatively easy access to the information being transmitted between the code entry module 403 and the controller 405. Such an unauthorised person can, given this physical access, decipher the communicated information between the code entry module 403 and the controller 405. This captured information can be deciphered, replayed in order to gain the access which rightfully belongs to the user 401, or to enable modification for other subversive purposes.

Current systems as depicted in FIG. 1 utilise a communication protocol called "Wiegand" for communication between the code entry module 403 and the controller 405. The Wiegand protocol is a simple one-way data protocol that can be modified by increasing or decreasing the bit count to ensure uniqueness of the protocol among different security companies. The Wiegand protocol does not secure the information being sent between the code entry module 403 and the controller 405.

More advanced protocols such as RS 485 have been used in order to overcome the vulnerability of the Wiegand protocol over the long distance route 404. RS 485 is a duplex protocol offering encryption capabilities at both the transmitting and receiving ends, i.e. the code entry module 403 and the controller 405 respectively in the present case. The length of the path 404 nonetheless provides an attack point for the unauthorised person.

Due to the cost and complexity of re-wiring buildings and facilities, security companies often make use of existing communication cabling when installing and/or upgraded security systems, thereby maintaining the vulnerability described above.

SUMMARY

It is an object of the present invention to substantially overcome, or at least ameliorate, one or more disadvantages of existing arrangements.

According to a first aspect of the present invention, there is provided a system for providing secure access to a controlled item, the system comprising:
a database of biometric signatures;
a transmitter subsystem comprising:
a biometric sensor for receiving a biometric signal;
means for matching the biometric signal against members of the database of biometric signatures to thereby output an accessibility attribute; and
means for emitting a secure access signal conveying information dependent upon said accessibility attribute, wherein the secure access signal comprises one of at least a rolling code, an encrypted Bluetooth™ protocol, and a WiFi™ protocol; and a receiver sub-system comprising;
means for receiving the transmitted secure access signal; and
means for providing conditional access to the controlled item dependent upon said information.

According to another aspect of the present invention, there is provided a transmitter sub-system for operating in a system for providing secure access to a controlled item, the system comprising a database of biometric signatures, a receiver sub-system comprising means for receiving a secure access signal transmitted by the transmitter sub-system, and means for providing conditional access to the controlled item dependent upon information conveyed in the secure access signal; wherein the transmitter subsystem comprises:
a biometric sensor for receiving a biometric signal;
means for matching the biometric signal against members of the database of biometric signatures to thereby output an accessibility attribute; and
means for emitting the secure access signal conveying said information dependent upon said accessibility attribute, wherein the secure access signal comprises one of at least a rolling code, an encrypted Bluetooth™ protocol, and a WiFi™ protocol.

According to another aspect of the present invention, there is provided receiver sub-system for operating in a system for providing secure access to a controlled item, the system comprising a database of biometric signatures, a transmitter sub-system comprising a biometric sensor for receiving a biometric signal, means for matching the biometric signal against members of the database of biometric signatures to thereby output an accessibility attribute, and means for emitting a secure access signal conveying information dependent upon said accessibility attribute, wherein the secure access signal comprises one of at least a rolling code, an encrypted Bluetooth™ protocol, and a WiFi™ protocol; wherein the receiver sub-system comprises:

means for receiving the transmitted secure access signal; and means for providing conditional access to the controlled item dependent upon said information.

According to another aspect of the present invention, there is provided a method for providing secure access to a controlled item, the method comprising the steps of:

receiving a biometric signal;

matching the biometric signal against members of a database of biometric signatures to thereby output an accessibility attribute;

emitting a secure access signal conveying information dependent upon said accessibility attribute, wherein the secure access signal comprises one of at least a rolling code, an encrypted Bluetooth™ protocol, and a WiFi™ protocol; and providing conditional access to the controlled item dependent upon said information.

According to another aspect of the present invention, there is provided a method for populating a database of biometric signatures in a system for providing secure access to a controlled item, the system comprising said database of biometric signatures, a transmitter subsystem comprising a biometric sensor for receiving a biometric signal, and means for emitting a secure access signal, and a receiver sub-system comprising means for receiving the transmitted secure access signal, and means for providing conditional access to the controlled item dependent upon information in said secure access signal, said method comprising the steps of:

receiving a series of entries of the biometric signal;

determining at least one of the number of said entries and a duration of each said entry;

mapping said series into an instruction; and populating the database according to the instruction.

According to another aspect of the present invention, there is provided a method for transmitting a secure access signal in a system for providing secure access to a controlled item, the system comprising a database of biometric signatures, a receiver sub-system comprising means for receiving the secure access signal transmitted by a transmitter sub-system, and means for providing conditional access to the controlled item dependent upon information conveyed in the secure access signal, said method comprising the steps of:

receiving a biometric sensor by biometric signal;

matching the biometric signal against members of the database of biometric signatures to thereby output an accessibility attribute; and emitting the secure access signal conveying said information dependent upon said accessibility attribute, wherein the secure access signal comprises one of at least a rolling code, an encrypted Bluetooth™ protocol, and a WiFi™ protocol.

According to another aspect of the present invention, there is provided a method for receiving a secure access signal in a system for providing secure access to a controlled item, the system comprising a database of biometric signatures, a transmitter subsystem comprising a biometric sensor for receiving a biometric signal, means for matching the biometric signal against members of the database of biometric signatures to thereby output an accessibility attribute, and means for emitting a secure access signal conveying information dependent upon said accessibility attribute, wherein the secure access signal comprises one of at least a rolling code, an encrypted Bluetooth™ protocol, and a WiFi™ protocol, said method comprising the steps of:

receiving the transmitted secure access signal; and providing conditional access to the controlled item dependent upon said information.

According to another aspect of the present invention, there is provided a computer program product having a computer readable medium having a computer program recorded therein for directing a processor to provide secure access to a controlled item, said computer program product comprising:

code for receiving a biometric signal;

code for matching the biometric signal against members of a database of biometric signatures to thereby output an accessibility attribute;

code for emitting a secure access signal conveying information dependent upon said accessibility attribute, wherein the secure access signal comprises one of at least a rolling code, an encrypted Bluetooth™ protocol, and a WiFi™ protocol; and code for providing conditional access to the controlled item dependent upon said information.

According to another aspect of the present invention, there is provided a computer program product having a computer readable medium having a computer program recorded therein for directing a processor to populate a database of biometric signatures in a system for providing secure access to a controlled item, said computer program product comprising:

code for receiving a series of entries of the biometric signal;

code for determining at least one of the number of said entries and a duration of each said entry;

code for mapping said series into an instruction; and code for populating the database according to the instruction.

According to another aspect of the present invention, there is provided a computer program product having a computer readable medium having a computer program recorded therein for directing a processor to transmit a secure access signal in a system for providing secure access to a controlled item, said computer program product comprising:

code for receiving a biometric sensor by biometric signal;

code for matching the biometric signal against members of the database of biometric signatures to thereby output an accessibility attribute; and code for emitting the secure access signal conveying said information dependent upon said accessibility attribute, wherein the secure access signal comprises one of at least a rolling code, an encrypted Bluetooth™ protocol, and a WiFi™ protocol.

According to another aspect of the present invention, there is provided a computer program product having a computer readable medium having a computer program recorded therein for directing a processor to receive a secure access signal in a system for providing secure access to a controlled item, said computer program product comprising:

code for receiving the transmitted secure access signal; and code for providing conditional access to the controlled item dependent upon said information.

According to another aspect of the present invention, there is provided a system for providing secure access, the system comprising:

a biometric sensor for authenticating the identity of a user;

a transmitter for transmitting information using a secure wireless signal dependent upon a request from the user and the authentication of the user identity; and a control panel for receiving the information and for providing the secure access requested.

Other aspects of the invention are also disclosed.

BRIEF DESCRIPTION OF THE DRAWINGS

Some aspects of the prior art and one or more embodiments of the present invention are described with reference to the drawings, in which.

DETAILED DESCRIPTION INCLUDING BEST MODE

Figure 1:
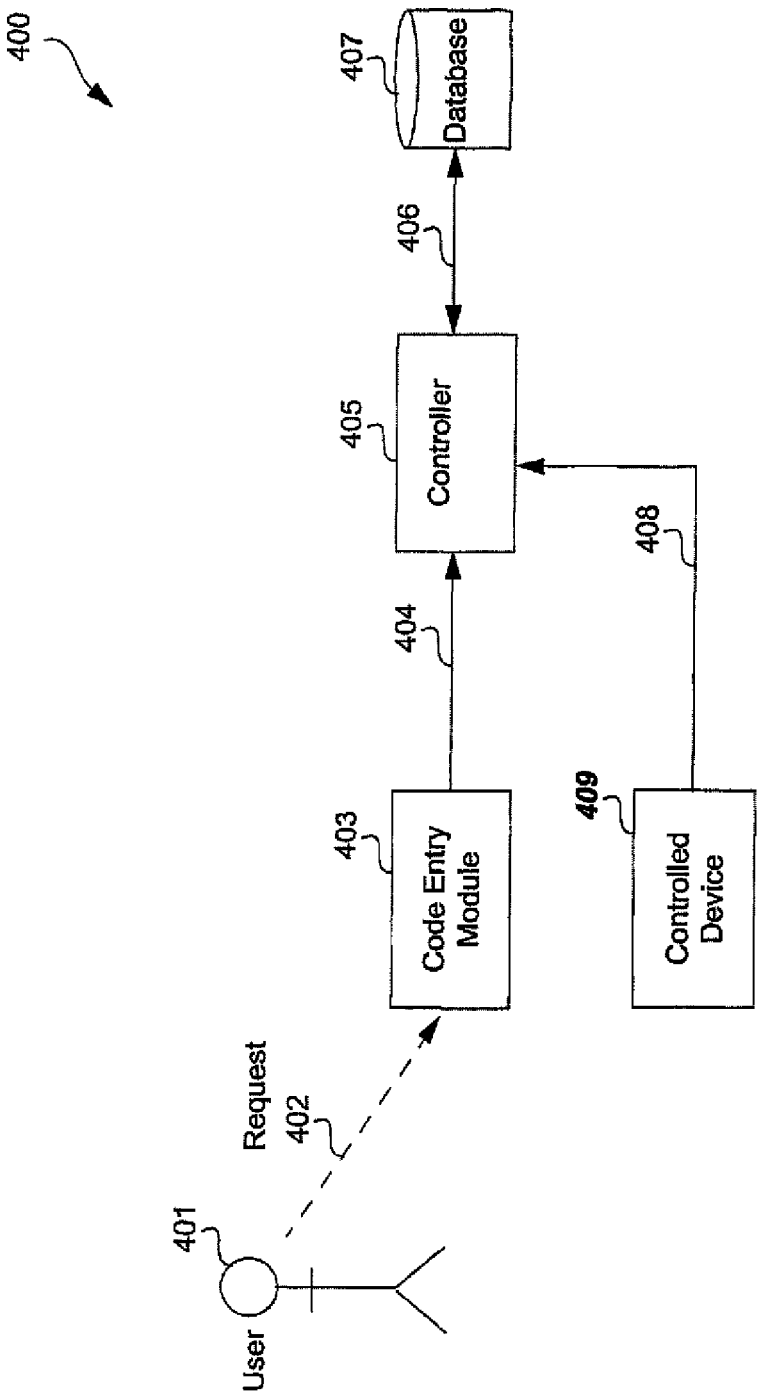
FIG. 1 shows a prior art arrangement for providing secure access.

It is to be noted that the discussions contained in the "Background" section relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

Figure 2:
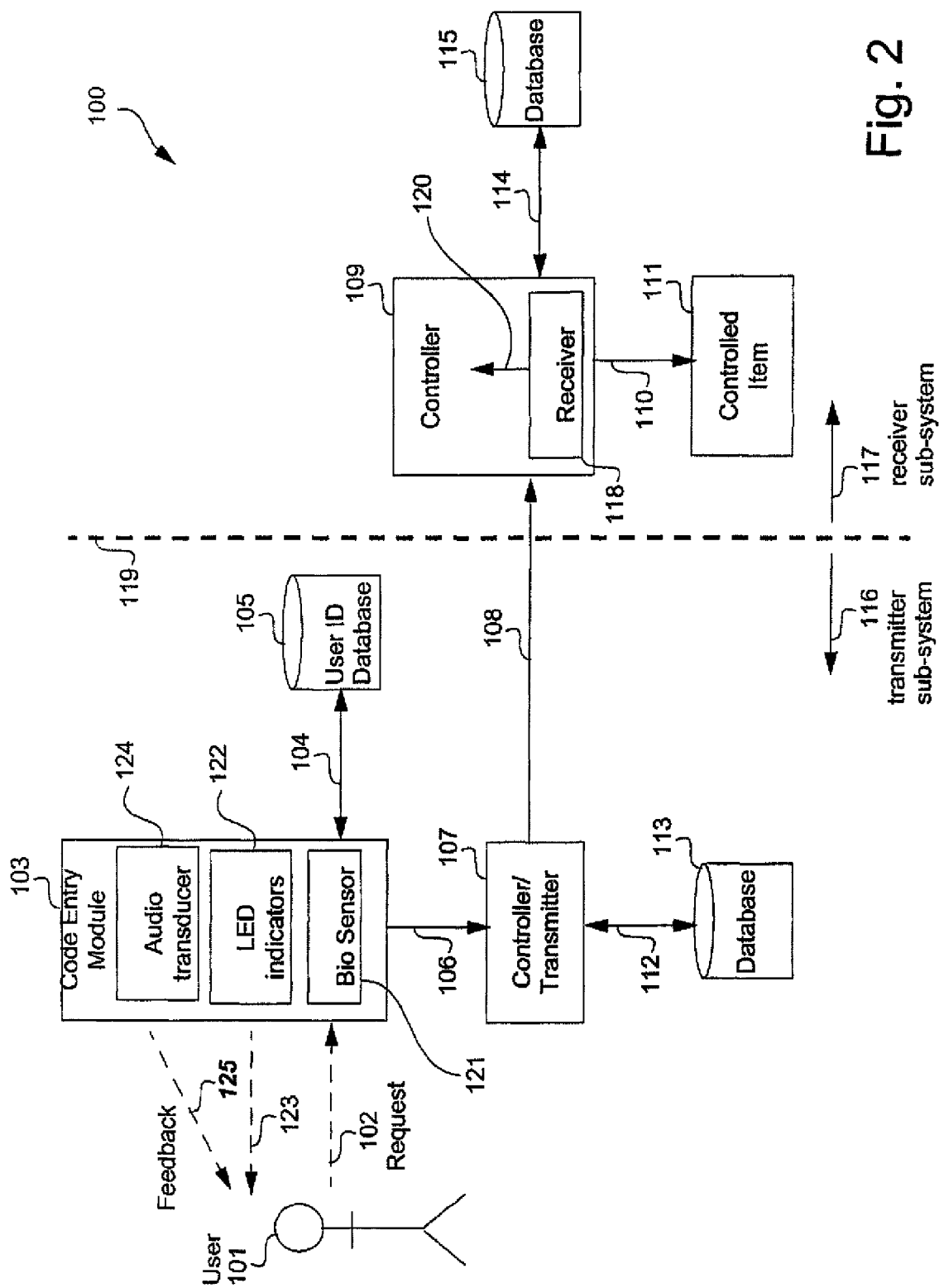
FIG. 2 is a functional block diagram of an arrangement for providing secure access according to the present disclosure.

FIG. 2 is a functional block diagram of an arrangement for providing secure access according to the present disclosure. A user 101 makes a request, as depicted by an arrow 102, to a code entry module 103. The code entry module 103 includes a biometric sensor 121 and the request 102 takes a form which corresponds to the nature of the sensor 121 in the module 103. Thus, for example, if the biometric sensor 121 in the code entry module 103 is a fingerprint sensor, then the request 102 typically takes the form of a thumb press on a sensor panel (not shown) on the code entry module 103.

The code entry module 103 interrogates, as depicted by an arrow 104, a user identity database 105. Thus for example if the request 102 is the thumb press on the biometric sensor panel 121 then the user database 105 contains biometric signatures for authorised users against which the request 102 can be authenticated. If the identity of the user 101 is authenticated successfully, then the code entry module 103 sends a signal 106 to a controller/transmitter 107. The controller/transmitter 107 checks, as depicted by an arrow 112, the current rolling code in a database 113. The controller 107 then updates the code and sends the updated code, this being referred to as an access signal, as depicted by an arrow 108 to a controller 109. The rolling code protocol offers non-replay encrypted communication.

The controller 109 tests the rolling code received in the access signal 108 against the most recent rolling code which has been stored in a database 115, this testing being depicted by an arrow 114. If the incoming rolling code forming the access signal 108 is found to be legitimate, then the controller 109 sends a command, as depicted by an arrow 110, to a controlled item 111. The controlled item 111 can be a door locking mechanism on a secure door, or an electronic key circuit in a personal computer (PC) that is to be accessed by the user 101. It is noted that the controller 109 contains a receiver 118 that receives the transmitted access signal 108 and converts it into a form that is provided, as depicted by an arrow 120, into a form that the controller 109 can use.

The code entry module 103 also incorporates at least one mechanism for providing feedback to the user 101. This mechanism can, for example, take the form or one or more Light Emitting Diodes (LEDs) 122 which can provide visual feedback, depicted by an arrow 123 to the user 101. Alternately or in addition the mechanism can take the form of an audio signal provided by an audio transducer 124 providing audio feedback 125.

The arrangement in FIG. 2 has been described for the case in which the secure code in the access signal 108 used between the sub-systems 116 and 117 is based upon the rolling code. It is noted that this is merely one arrangement, and other secure codes can equally be used. Thus, for example, either of the Bluetooth™ protocol, or the Wi Fi™ protocols can be used.

Rolling codes provide a substantially non-replayable non-repeatable and encrypted radio frequency data communications scheme for secure messaging. These codes use inherently secure protocols and serial number ciphering techniques which in the present disclosure hide the clear text values required for authentication between the key fob (transmitter) sub-system 116 and the receiver/controller 118/109.

Rolling codes use a different code variant each time the transmission of the access signal 108 occurs. This is achieved by encrypting the data from the controller 107 with a mathematical algorithm, and ensuring that successive transmissions of the access signal 108 are modified using a code and/or a look-up table known to both the transmitter sub-system 116 and the receiver sub-system 117. Using this approach successive transmissions are modified, resulting in a non-repeatable data transfer, even if the information from the controller 107 remains the same. The modification of the code in the access signal 108 for each transmission significantly reduces the likelihood that an intruder can access the information replay the information to thereby gain entry at some later time.

The sub-system in FIG. 2 falling to the left hand side, as depicted by an arrow 116, of a dashed line 119 can be implemented in a number of different forms. The sub-system 116 can for example be incorporated into a remote fob (which is a small portable device carried by the user 101), or alternately can be mounted in a protected enclosure on the outside jamb of a secured door. The sub-system 116 communicates with the sub-system 117 on the right hand side of the dashed line 119 via the wireless communication channel used by the access signal 108. The sub-system 117 is typically located in an inaccessible area such as a hidden roof space or alternately in a suitable protected area such as an armoured cupboard.

The location of the sub-system 117 must of course be consistent with reliable reception of the wireless access signal 108.

Although typically the communication channel uses a wireless transmission medium, there are instances where the channel used by the access signal 108 can use a wired medium. This is particularly the case when the transmitter sub-system 116 is mounted in an enclosure on the door jamb rather than in a portable key fob.

The biometric signature database 105 is shown in FIG. 2 to be part of the transmitter sub-system 116. However, in an alternate arrangement, the biometric signature database 105 can be located in the receiver sub-system 117, in which case the communication 104 between the code entry module 103 and the signature database 105 can also be performed over a secure wireless communication channel such as the one used by the access signal 108. In the event that the secure access system is being applied to providing secure access to a PC, then the secured PC can store the biometric signature of the authorised user in internal memory, and the PC can be integrated into the receiver sub-system 117 of FIG. 1.

In the event that the sub-system 116 is implemented as a remote fob, the combination of the biometric verification and the strongly encrypted wireless communication provides a particularly significant advantage over current systems. The remote key fob arrangement allows easy installation, since the wired communication path 404 (see FIG. 1) is avoided. Other existing wiring elements of the present systems 400 can be used where appropriate. When the sub-system 116 is implemented as a remote fob, the fob incorporates the biometric (eg fingerprint) authentication arrangement, in which case only one biometric signature is stored in the fob. This arrangement reduces the requirements on the central database 115. Once the key fob authenticates the user through biometric signature (eg fingerprint) verification, the rolling code in the access signal 108 is transmitted to the controller 109 for authorisation of the user for that location at that time.

In addition to authenticating the user 101 the biometric sensor 121 in the code entry module 103 in conjunction with the controller 107 can also check other access privileges of the user 101. These access privileges can be contained in the database 105 which can be located either locally in the remote key fob, or in the receiver sub-system 117 as previously described. In one example, Tom Smith can firstly be authenticated as Tom Smith using the thumb press by Tom on the biometric sensor panel (not shown). After Tom's personal biometric identity is authenticated, the transmitter sub-system 116 can check if Tom Smith is in fact allowed to use the particular door secured by the device 111 on weekends. Thus the security screening offered by the described arrangement can range from simple authentication of the user's identity, to more comprehensive access privilege screening.

The incorporation of the biometric sensor 121 into the code entry module 103 in the form of a remote key fob also means that if the user 101 loses the remote key fob, the user need not be concerned that someone else can use it. Since the finder of the lost key fob will not be able to have his or her biometric signal authenticated by the biometric sensor 121 in the code entry module 103, the lost key fob is useless to anyone apart from the rightful user 101.

The transmitter sub-system 116 is preferably fabricated in the form of a single integrated circuit (IC) to reduce the possibility of an authorised person bypassing the biometric sensor 121 in the code entry module 103 and directly forcing the controller 107 to emit the rolling code access signal 108.

Figure 3:
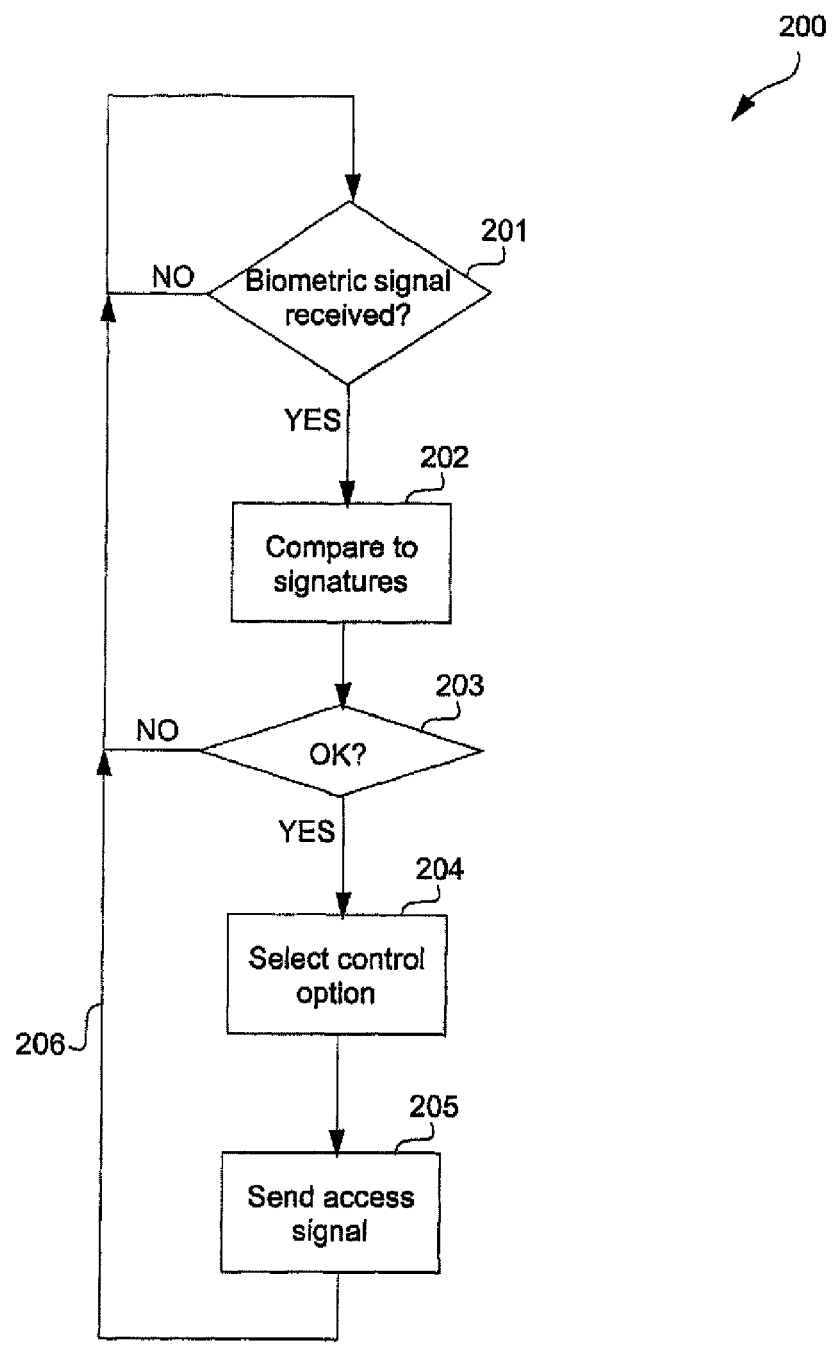
FIG. 3 shows an example of a method of operation of the remote control module of FIG. 2.

FIG. 3 shows the method of operation of the remote control module (i.e. the sub-system 116) of FIG. 2. The method 200 commences with a testing step 201 in which the biometric sensor 121 in the code entry module 103 checks whether a biometric signal 102 is being received. If this is not the case, then the method 200 is directed in accordance with an NO arrow back to the step 201 in a loop. If, on the other hand, the biometric signal 102 has been received, then the method 200 is directed in accordance with a YES arrow to a step 202. The step 202 compares the received biometric signal 102 with information in the biometric signature database 105 in order to ensure that the biometric signal received 102 is that of the rightful user 101 of the sub-system 116.

A subsequent testing step 203 checks whether the comparison in the step 202 yields the desired authentication. If the biometric signature matching is authenticated, then the process 200 is directed in accordance with a YES arrow to a step 204. The authentication of the biometric signature matching produces an accessibility attribute for the biometric signal 102 in question. The accessibility attribute establishes whether and under which conditions access to the controlled item 111 should be granted to a user. Thus, for example, the accessibility attribute may comprise one or more of an access attribute (granting unconditional access), a duress attribute (granting access but with activation of an alert tone to advise authorities of the duress situation), an alert attribute (sounding a chime indicating that an unauthorised, but not necessarily hostile, person is seeking access, and a telemetry attribute, which represents a communication channel for communicating state information for the transmitter sub-system to the receiver sub-system such as a "low battery" condition. The step 204 enables the user 101 to select a control option by providing one or more additional signals (not shown) to the controller 107. Thus for example the control option could enable the user 101 to access one of a number of secure doors after his or her identity has been authenticated in the step 203. In the subsequent step 205 the controller 107 sends the appropriate access signal 108 to the controller 109. The process 200 is then directed in accordance with an arrow 206 back to the step 201.

Thus for example the sub-system 116 can be provided with a single biometric sensor 121 in the code entry module 103 which enables the user 101 to select one of four door entry control signals by means of separate buttons on the controller 107 (not shown). This would enable the user 101, after authentication by the biometric sensor 121 in the code entry module 103 and the controller 107 to obtain access to any one of the aforementioned for secure doors.

Returning to the testing step 203, if the signature comparison indicates that the biometric signal 102 is not authentic, and has thus not been received from the proper user, then the process 200 is directed in accordance with a NO arrow back to the step 201. In an alternate arrangement, the NO arrow from the step 203 could lead to a disabling step which would disable further operation of the sub-system 116, either immediately upon receipt of the incorrect biometric signal 102, or after a number of attempts to provide the correct biometric signal 102.

Figure 4:
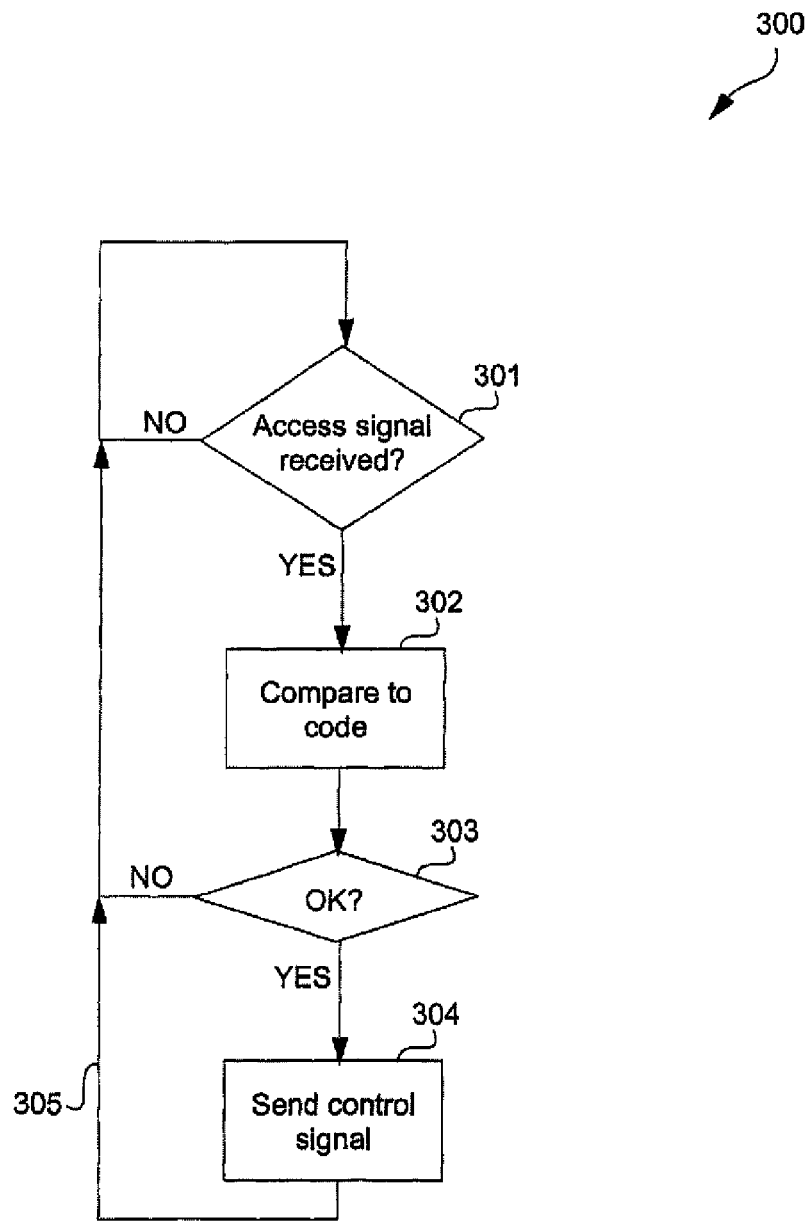
FIG. 4 shows an example of a method of operation of the (fixed) control device of FIG. 2.

FIG. 4 shows the method of operation of the control sub-system 117 of FIG. 2. The method 300 commences with a testing step 301 which continuously checks whether the access signal 108 has been received from 107. The step 301 is performed by the controller 109. As long as the access signal 108 is not received the process 300 is directed in accordance with a NO arrow in a looping manner back to the step 301. When the access signal 108 is received, the process 300 is directed from the step 301 by means of a YES arrow to a step 302. In the step 302, the controller 109 compares the rolling code received by means of the access signal 108 with a reference code in the database 115. A subsequent testing step 303 is performed by the controller 109. In the step 303 if the code received on the access signal 108 is successfully matched against the reference code in the database 115 then the process 300 is directed in accordance with a YES arrow to a step 304.

In the step 304 the controller 109 sends the control signal 110 to the controlled item 111 (for example opening the secured door). The process 300 is then directed from the step 304 as depicted by an arrow 305 back to the step 301. Returning to the testing step 303 if the code received on the access signal 108 is not successfully matched against the reference code in the database 115 by the controller 109 then the process 300 is directed from the step 303 in accordance with a NO arrow back to the step 301.

As was described in regard to FIG. 3, in an alternate arrangement, the process 300 could be directed, if the code match is negative, from the step 303 to a disabling step which would disable the sub-system 117 if the incorrect code where received once or a number of times.

Figure 5:
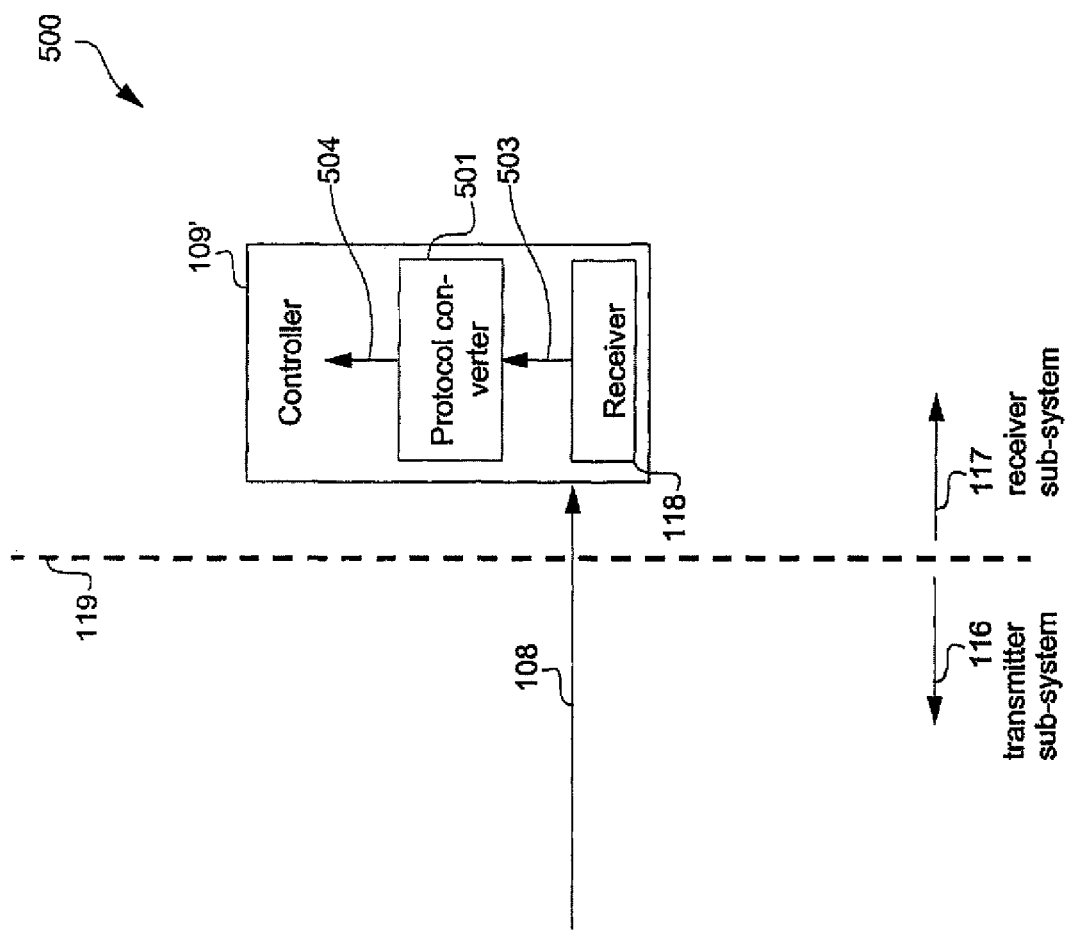
FIG. 5 shows incorporation of a protocol converter into the arrangement of FIG. 2.

FIG. 5 shows incorporation of a protocol converter into the arrangement of FIG. 2. In the arrangement of FIG. 2 the receiver 118 in the controller 109 is able to directly receive and process the rolling code in the access signal 108 in a manner as to provide, as depicted by the arrow 120, the necessary information to the controller 109. FIG. 5 shows how an existing controller depicted by a reference numeral 109' that uses Wiegand input signalling can be used in the disclosed arrangement when alarm systems are upgraded. FIG. 5 shows how the incoming access signal 108 is received by a receiver 118' as is the case in FIG. 2. In FIG. 5 however the receiver 118' provides, as depicted by an arrow 503, the received rolling code from the access signal 108 to a rolling code/Wiegand protocol converter 501. The converter 501 converts, as depicted by an arrow 504, the incoming rolling code 503 to a form that can be used by the controller 109' that is designed to handle Wiegand protocol incoming signals. Therefore, the converted incoming signal 504 is in the Wiegand format.

The converter 501 uses a microprocessor-based arrangement running software code to process the incoming rolling code information 503 and decode this information 503 to clear text form. The converter 501 converts this clear text to a Wiegand variable bit-length data stream. In FIG. 2, the receiver 118 performs the conversion of the incoming rolling code access signal 108 to clear text which enables the controller 109 to identify the serial number of the originating key fob sub-system 116 to enable the access rights of the user to be verified.

Further to the Wiegand conversion arrangement, the protocol converter 501 approach can be adapted to convert between the incoming rolling code 503 (or any other appropriate secure code) to any other convenient protocol used by the controller 169'

The advantage of the rolling code/Wiegand converter 501 is that security system upgrades can be made without replacing Wiegand compatible controller 109'. Accordingly, existing systems as are described in FIG. 1 can be upgraded by replacing the code entry module 403 and the transmission path 404, leaving the other components of the system 400 (i.e., the controller 405, the code database 407, and the controlled item 409, together with existing wiring 408 and 406), largely intact. Minor modifications might however be necessary. When upgrading systems in this manner, the sub-system 116 can either be used in a remote fob configuration, or can be placed in a secure housing on an external door jamb.

From a practical perspective, incorporating the protocol converter 501 into an existing controller 109' would require direct wiring of the converter 501 into the housing of the secure controller 109'.

Figure 6:
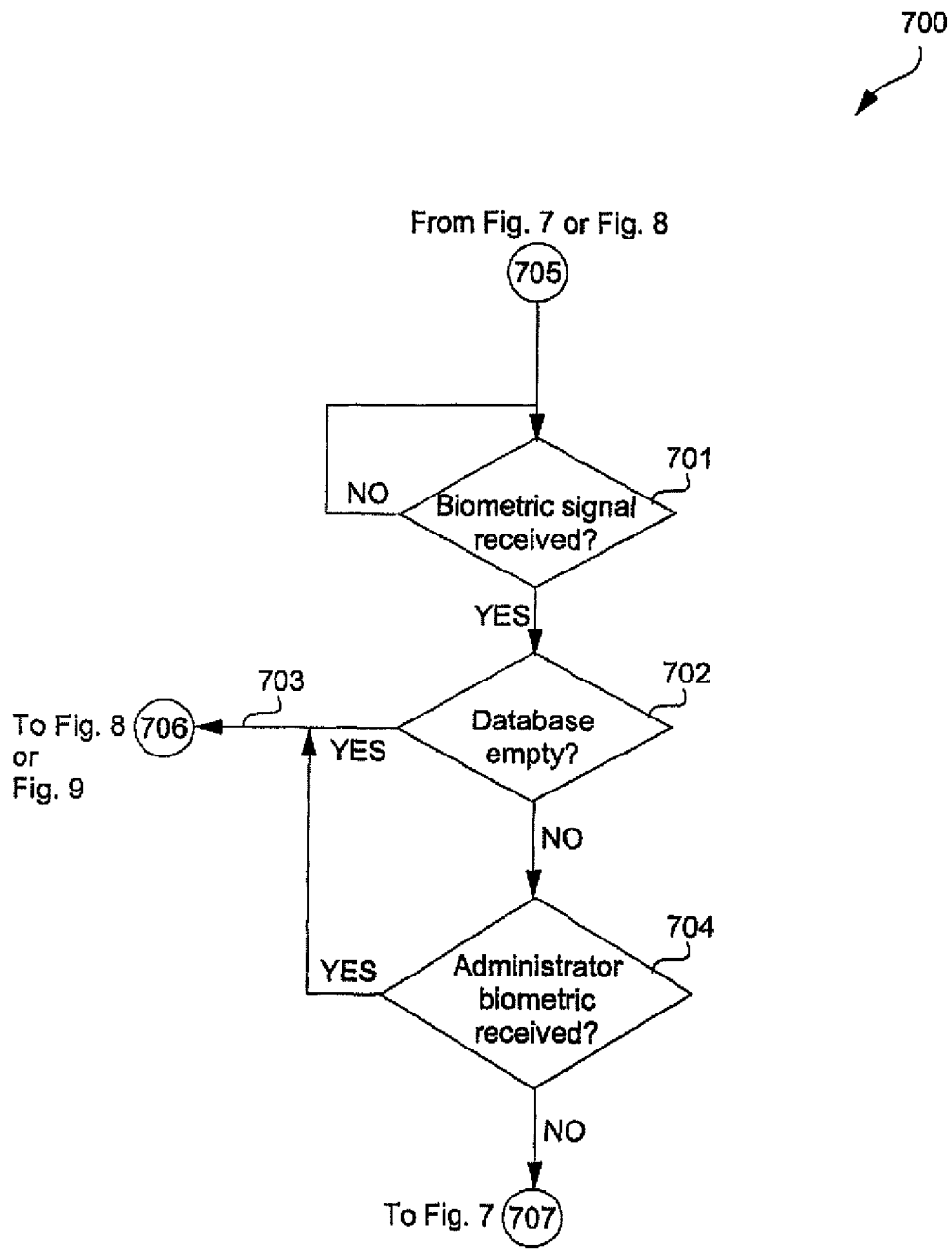
FIG. 6 shows another example of how the remote access system operates.

FIG. 6 shows another process 700 of operation of the remote access system. The process 700 commences with a step 701 that determines if a biometric signal has been received by the biometric sensor 121 in the code entry module in FIG. 2. If not, then the process 700 follows a NO arrow back to the step 701. If however a biometric signal has been received, then the process 700 follows a YES arrow to a step 702 that determines if the user ID database 105 in FIG. 2 is empty. This would be the case, for example, if the code entry module is new and has never been used, or if the user 101 has erased all the information in the database 105.

Figure 8:
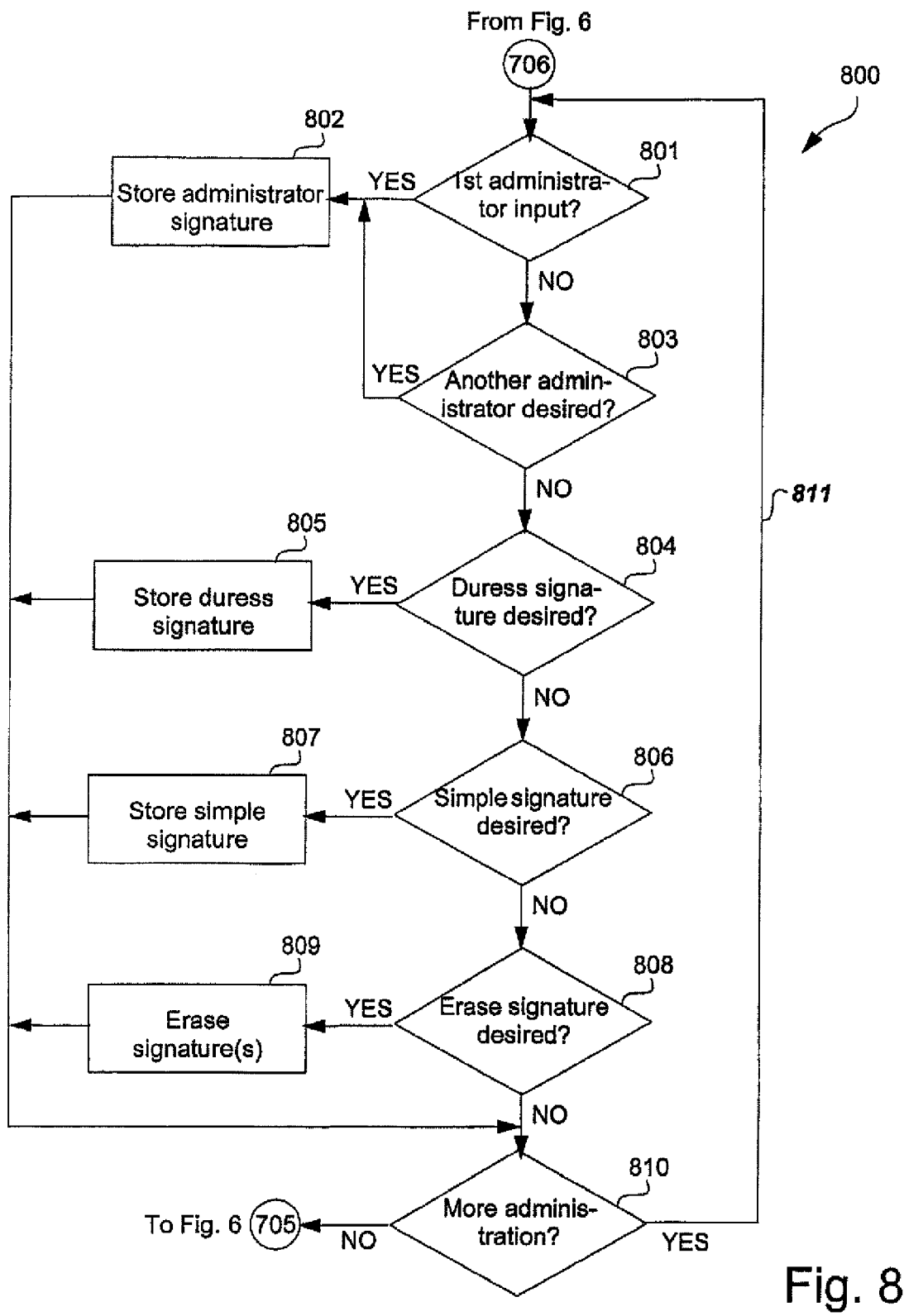
FIG. 8 shows one enrolment process relating to the example of FIG. 6.

If the database 105 is empty, then the process 700 is directed by an arrow 703 to 706 in FIG. 8 which depicts a process 800 dealing with the enrolment or the administration function for loading relevant signatures into the database 105. If on the other hand the database 105 is not empty, then the process 700 is directed to a step 704 that determines if the biometric signal that has been received is an administrator's biometric signal.

The disclosed remote entry system can accommodate at least three classes of user, namely administrators, (ordinary) users, and duress users. The administrators have the ability to amend data stored, for example, in the database 105, while the ordinary users do not have this capability. The first user of the code entry module 103, whether this is the user who purchases the module, or the user who programs the module 103 after all data has been erased from the database 105, is automatically categorised as an administrator. This first administrator can direct the system 100 to either accept further administrators, or alternately to only accept further ordinary users.

Although the present description refers to "Users", in fact it is "fingers" which are the operative entities in system operation when the biometric sensor 121 (see FIG. 2) is a fingerprint sensor. In this event, a single user can enrol two or more of his or her own fingers as separate administrators or (ordinary) users of the system, by storing corresponding fingerprints for corresponding fingers in the database 105 via the enrolment process 800 (see FIG. 8).

Some class overlap is possible. Thus a stored signature can belong to an administrator in the duress class.

The first administrator can provide control information to the code entry module by providing a succession of finger presses to the biometric sensor 121, providing that these successive presses are of the appropriate duration, the appropriate quantity, and are input within a predetermined time. In one arrangement, the control information is encoded by either or both (a) the number of finger presses and (b) the relative duration of the finger presses. If the successive finger presses are provided within this predetermined time, then the controller 107 accepts the presses as potential control information and checks the input information against a stored set of legal control signals.

One example of a legal control signal can be expressed as follows:

"Enrol an ordinary user"→dit, dit, dit, dah
where "dit" is a finger press of one second's duration (provided by the user 101 in response to the feedback provided by the Amber LED as described below), and "dah" is a finger press of two second's duration.

In the event that a legitimate sequence of finger presses are not delivered within the predetermined time, then the presses are considered not to be control information and merely to be presses intended to provide access to the controlled item 111.

Legitimate control sequences are defined in Read Only Memory (ROM) in the controller 107.

The code entry module 103 has feedback signalling mechanisms 122, implemented for example by a number of LEDs, and 124, implemented by an audio transducer. The LEDs 122 and the audio transducer 124 are used by the controller to signal the state of the code entry module 103 to the user 101, and to direct the administration process. Thus, in one example, three LEDs, being Red, Amber and Green are provided.

When the Amber LED is flashing, it means "Press the sensor". When the Amber LED is steady ON, it means "Maintain finger pressure". When the Amber LED is OFF, it means "Remove finger pressure". When the system enters the enrolment state (depicted by the process 800 in FIG. 8), then the audio transducer 124 emits the "begin enrolment" signal (dit dit dit dit dit) and the Red LED flashes. Enrolment of a normal user (according to the step 807 in FIG. 8) is signalled by the OK audio signal (dit dit) and a single blink of the Green LED.

Returning to the step 704, if the step determines that the biometric signal received is an administrator's signal, then the process 700 is directed by a YES arrow to 706 in FIG. 8 as depicted by the arrow 703. If on the other hand, the step 704 indicates that the received biometric signal does not belong to an administrator then the process 700 is directed by a NO arrow to 707 in FIG. 7.

Figure 7:
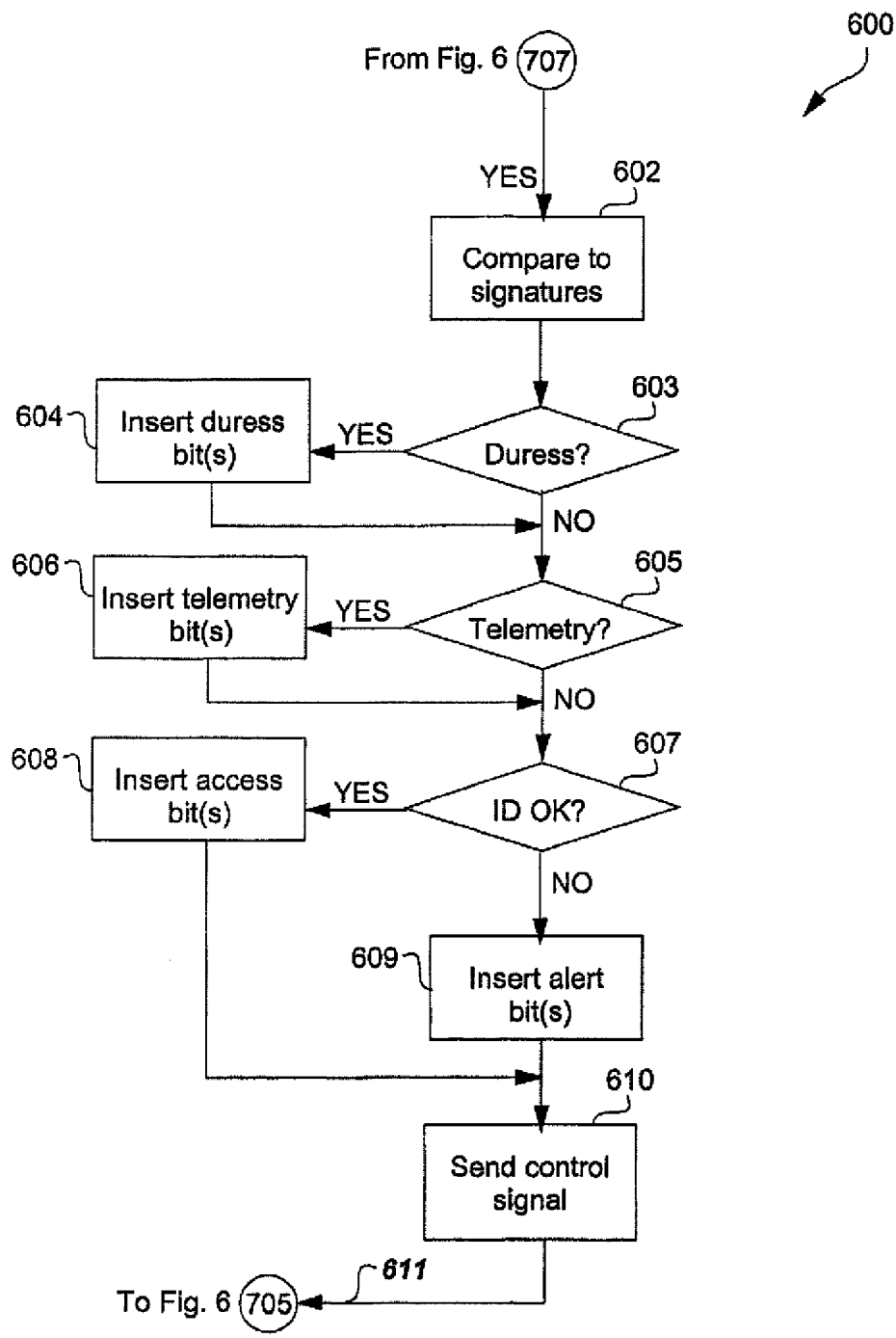
FIG. 7 shows an access process relating to the example of FIG. 6.

FIG. 7 shows the access process 600 by which a biometric signal 102 (see FIG. 2) is processed in order to provide access to the controlled item 111, or to take other action. Entering the process at 707 from FIG. 6, the process 600 proceeds to a step 602 that compares the received biometric signature to signatures stored in the database 105. A following step 603 determines if the received signal falls into the "duress" category. Signatures in this category indicate that the user 101 is in a coercive situation where, for example, an armed criminal is forcing the user 101 to access the secure facility (such as a bank door). If the step 603 determines that the signature is in the duress class, then a following step 604 prepares a "duress" bit for incorporation into the code access signal 108. The aforementioned duress bit is an access attribute of the biometric signal 102. Thereafter the process 600 proceeds to a step 605.

Modules used in the code entry module for producing the rolling code enable a number of user defined bits to be inserted into the access signal 108, and these bits can be used to effect desired control functions in the receiver sub-system 117. The disclosed system 100 utilises four such user bits, namely (a) to indicate that the user belongs to the duress category, (b) to indicate a "battery low" condition, or other desired system state or "telemetry" variable, for the code entry module 103, (c) to indicate that the biometric signal represents a legitimate user in which case the secure access to the controlled item 111 is to be granted, or (d) to indicate that the biometric signal is unknown, in which case the controller 109 in the receiver sub-system 117 sounds an alert tone using a bell (not shown) or the like.

Returning to FIG. 7, if the step 603 determines that the biometric signal is not in the duress class, then the process 600 proceeds according to a NO arrow to the step 605. The step 605 determines if the code entry module 103 has a low battery condition, in which event the process 600 proceeds according to a YES arrow to a step 606 that prepares a telemetry bit for insertion into the access signal 108. The aforementioned telemetry bit is an access attribute of the biometric signal 102. Thereafter, the process proceeds to a step 607.

If the step 605 determines that telemetry signalling is not required, then the process 600 proceeds according to a NO arrow to the step 607. The step 607 checks the biometric signal against the signatures in the database 105. If the received biometric signal matches a legitimate signature in the database 105, then the process is directed to a step 608 that prepares an "access" bit for insertion into the access signal 108. This access bit directs the controller 109 in the receiver sub-system 117 to provide access to the controlled item 111. The aforementioned access bit is an access attribute of the biometric signal 102. The process 600 then proceeds to a step 610.

If the step 607 determines that the biometric input signal does not match any legitimate signatures in the database 105, then the process 600 proceeds according to a NO arrow to a step 609 that prepares an "alert" bit for insertion into the access signal 108. The aforementioned alert bit is an access attribute of the biometric signal 102. This alert bit directs the controller 109 (a) not to provide access to the controlled item 111, and (b) to provide an alert tone, like ringing a chime or a bell (not shown), to alert personnel in the vicinity of the receiver sub-system 117 that an unauthorised user is attempting to gain access to the controlled item 111. The alert bit can also cause a camera mounted near the controlled item 111 to photograph the unauthorised user for later identification of that person. The camera can be activated if the person attempting to gain access is unauthorised, and also if the person attempting to gain access is authorised but uses a duress signature.

An optional additional step (not shown) can prepare an identification field for insertion into the access signal 108. This sends, to the receiver sub-system 117, ID information that the receiver sub-system can use to construct an audit trail listing which users, having signatures in the database 105, have been provided with access to the controlled item 111.

The process 600 is then directed to the step 610 which inserts the various user defined bits into the access signal 108 and sends the signal 108 to the receiver sub-system 117. Thereafter, the process 600 is directed by an arrow 611 to 705 in FIG. 6.

FIG. 8 shows a process 800 for implementing various enrolment procedures. The process 800 commences at 706 from FIG. 6 after which a step 801 determines if the biometric signal is a first administrators input (which is the case if the database 105 is empty). If this is the case, then the process 800 is directed to a step 802 that stores the administrator's signature in the database 105. From a terminology perspective, this first administrator, or rather the first administrator's first finger (in the event that the biometric sensor 121 in FIG. 2 is a fingerprint sensor), is referred to as the "superfinger". Further administrator's fingers are referred to as admin-fingers, and ordinary users fingers are referred to merely as "fingers". The reason that someone would enrol more than one of their own fingers into the system is to ensure that even in the event that one of their enrolled fingers is injured, the person can still operate the system using another enrolled finger.

It is noted that the step 802, as well as the steps 805, 807 and 809 involve sequences of finger presses on the biometric sensor 121 in conjunction with feedback signals from the LEDs 122 and/or the audio speaker 124. The process 800 then proceeds to a step 810 that determines if further enrolment procedures are required. If this is the case, then the process 800 proceeds by a YES arrow back to the step 801. If no further enrolment procedures are required, then the process 800 proceeds by a NO arrow to 705 in FIG. 6.

Returning to the step 801, if the biometric signal is not a first administrator's signal, then the process 800 proceeds by a NO arrow to a step 803. The step 803 determines if a further administrator signature is to be stored. It is noted that all signatures stored in the database are tagged as belonging to one or more of the classes of administrator, ordinary user, and duress users. If a further administrator signature is to be stored, then the process 800 proceeds by a YES arrow to the step 802 that stores the biometric signal as a further administrator's signature.

If a further administrator's signature is not required, then the process 800 proceeds according to a NO arrow to a step 804 that determines if a duress signature is to be stored. If this is the case then the process 800 follows a YES arrow to a step 805 that stores a duress signature. The process 800 then proceeds to the step 810. If however the step 804 determines that a duress signature is not required, then the process 800 proceeds by a NO arrow to s step 806.

The step 806 determines if a further simple signature (i.e. belonging to an ordinary user) is to be stored. If a further simple signature is to be stored, then the process 800 proceeds by a YES arrow to the step 807 that stores the biometric signal as a further ordinary signature.

If a further simple signature is not required, then the process 800 proceeds according to a NO arrow to a step 808 that determines if any or all signatures are to be erased from the database 105. If this is the case then the process 800 follows a YES arrow to a step 809 that erases the desired signatures. The process 800 then proceeds to the step 810. If however the step 804 determines that no signatures are to be erased, then the process 800 proceeds by a NO arrow to the step 810.

Figure 9:
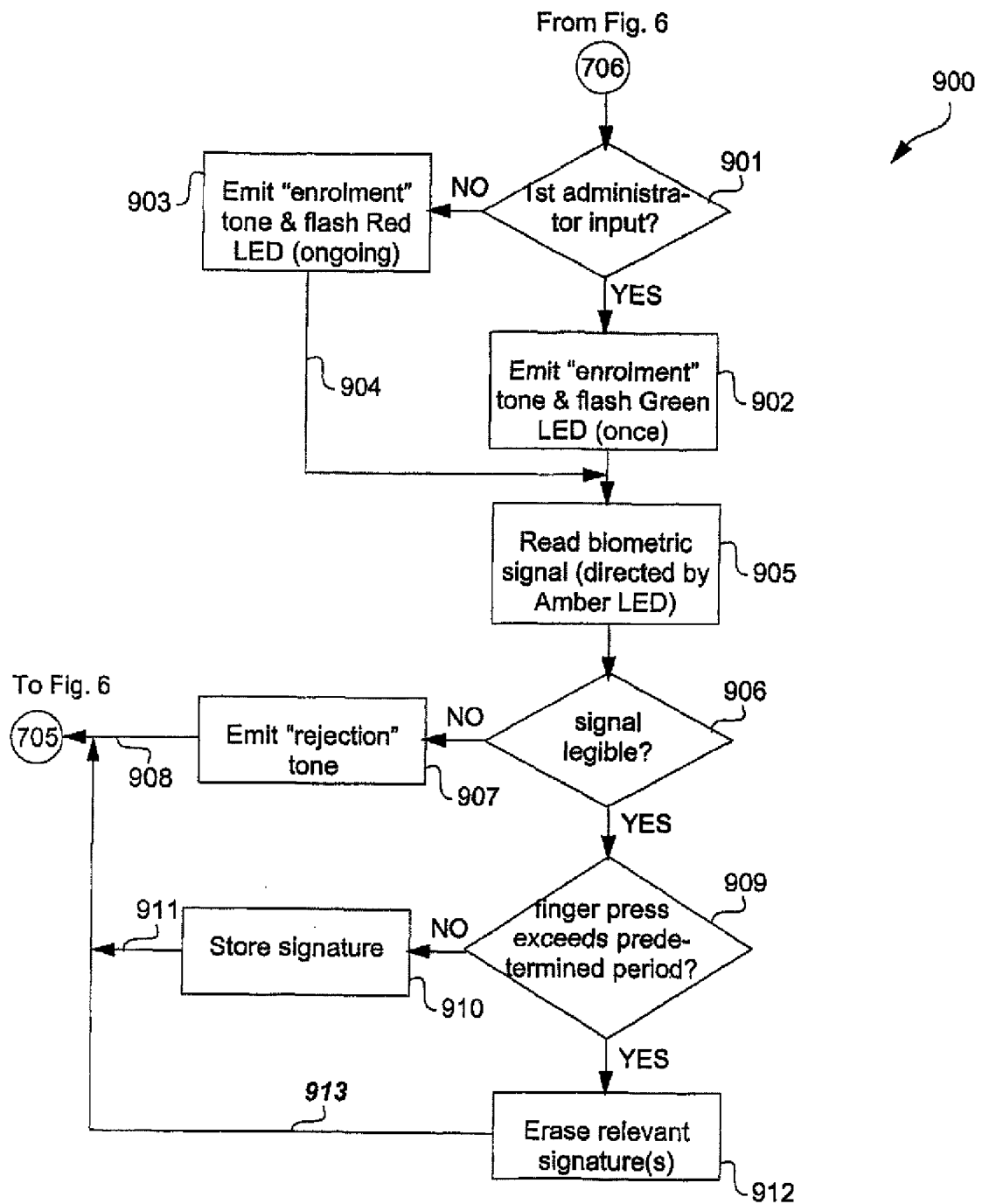
FIG. 9 shows another enrolment process relating to the example of FIG. 6.

FIG. 9 shows another enrolment process relating to the example of FIG. 6. The process 900 commences at 706 from FIG. 6 after which a step 901 determines if the received biometric signal comes from the first administrator. If this is the case, then the process 900 proceeds according to a YES arrow to a step 902. The step 902 emits an "Enrolment" tone and flashes the green LED once only. Thereafter, a step 905 reads the incoming biometric signal which is provided by the user as directed by the Amber LED. When the Amber LED flashes continuously, this directs the user to "Apply Finger". When the Amber LED is in a steady illuminated state, this directs the user to "Maintain Finger Pressure". Finally, when the amber LED is off, this directs the user to "Remove Finger".

Returning to the step 901, if the incoming biometric signal does not belong to the first administrator, then the process 900 proceeds according to a NO arrow to a step 903. The step 903 emits an "Enrolment" tone, and flashes the Red LED in an on-going fashion. Thereafter, the process 900 proceeds according to an arrow 904 to the step 905.

Following the step 905, a step 906 determines whether the incoming biometric signal is legible. If this is not the case, then the process 900 proceeds according to a NO arrow to a step 907. The step 907 emits a "Rejection" tone, after which the process 900 is directed, according to an arrow 908 to 705 in FIG. 6. Returning to the step 906, if the incoming biometric signal is legible, then the process 900 follows a YES arrow to a step 909. The step 909 determines whether the finger press exceeds a predetermined time. If this is not the case, then the process 900 follows a NO arrow to a step 910 which stores the biometric signal, which in the present case is a fingerprint signature. Thereafter the process 900 follows an arrow 911 to 705 in FIG. 6.

Returning to the step 909 if the finger press does exceed the predetermined period, then the process follows a YES arrow to a step 912. The step 912 erases relevant signatures depending upon the attributes of the incoming biometric signal. Thus, for example, if the incoming biometric signal belongs to an ordinary user, then the ordinary user's signature in the database 105 is erased by the step 912. If, on the other hand, the incoming biometric signal belongs to the first administrator, then all the signatures in the database 105 are erased. Administrators who are not the first administrator can be granted either the same powers as the first administrator in regard to erasure of signatures, or can be granted the same powers as ordinary user in this respect.

Once the step 912 has completed erasure of the relevant signatures, then the process 900 follows an arrow 913 to 705 in FIG. 6.

Figure 10:
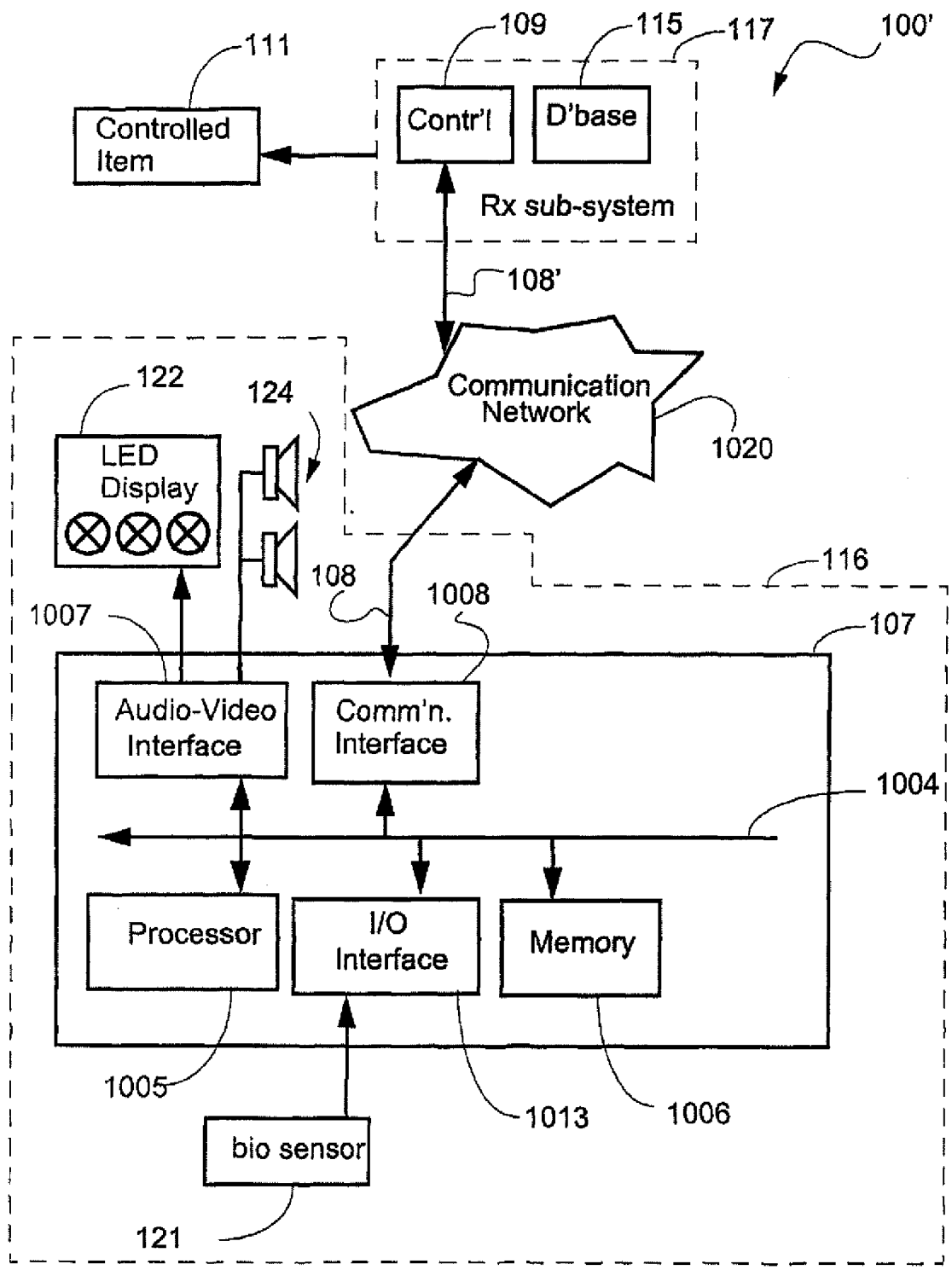
FIG. 10 is a schematic block diagram of the system in FIG. 2.

FIG. 10 is a schematic block diagram of the system in. FIG. 2. The disclosed secure access methods are preferably practiced using a computer system arrangement 100', such as that shown in FIG. 10 wherein the processes of FIGS. 3-4, and 6-9 may be implemented as software, such as application program modules executing within the computer system 100'. In particular, the method steps for providing secure access are effected by instructions in the software that are carried out under direction of the respective processor modules 107 and 109 in the transmitter and receiver sub-systems 116 and 117. The instructions may be formed as one or more code modules, each for performing one or more particular tasks. The software may also be divided into two separate parts, in which a first part performs the provision of secure access methods and a second part manages a user interface between the first part and the user. The software may be stored in a computer readable medium, including the storage devices described below, for example. The software is loaded into the transmitter and receiver sub-systems 116 and 117 from the computer readable medium, and then executed under direction of the respective processor modules 107 and 109. A computer readable medium having such software or computer program recorded on it is a computer program product. The use of the computer program product in the computer preferably effects an advantageous apparatus for provision of secure access.

The following description is directed primarily to the transmitter sub-system 116, however the description applies in general to the operation of the receiver sub-system 117. The computer system 100' is formed, having regard to the transmitter sub-system 116, by the controller module 107, input devices such as the bio sensor 121, output devices including the LED display 122 and the audio device 124. A communication interface/transceiver 1008 is used by the controller module 107 for communicating to and from a communications network 1020. Although FIG. 2 shows the transmitter sub-system 116 communicating with the receiver sub-system 117 using a direct wireless link for the access signal 108, this link used by the access signal 108 can be effected over the network 1020 forming a tandem link comprising 108-1020-108'. The aforementioned communications capability can be used to effect communications between the transmitter sub-system 116 and the receiver sub-system 117 either directly or via the Internet, and other network systems, such as a Local Area Network (LAN) or a Wide Area Network (WAN).

The controller module 107 typically includes at least one processor unit 1005, and a memory unit 1006, for example formed from semiconductor random access memory (RAM) and read only memory (ROM). The controller module 107 also includes an number of input/output (I/O) interfaces including an audio-video interface 1007 that couples to the LED display 122 and audio speaker 124, an I/O interface 1013 for the bio-sensor 121, and the interface 1008 for communications. The components 1007, 1008, 1005, 1013 and 1006 the controller module 107 typically communicate via an interconnected bus 1004 and in a manner which results in a conventional mode of operation of the controller 107 known to those in the relevant art.

Typically, the application program modules for the transmitter sub-system 116 are resident in the memory 1006 iROM, and are read and controlled in their execution by the processor 1005. Intermediate storage of the program and any data fetched from the bio sensor 121 and the network 1020 may be accomplished using the RAM in the semiconductor memory 1006. In some instances, the application program modules may be supplied to the user encoded into the ROM in the memory 1006. Still further, the software modules can also be loaded into the transmitter sub-system 116 from other computer readable media, say over the network 1020. The term "computer readable medium" as used herein refers to any storage or transmission medium that participates in providing instructions and/or data to the transmitter sub-system 116 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the transmitter sub-system 116. Examples of transmission media include radio or infra-red transmission channels as well as a network connection to another computer or networked device, and the Internet or Intranets including e-mail transmissions and information recorded on Websites and the like.

INDUSTRIAL APPLICABILITY

It is apparent from the above that the arrangements described are applicable to the security industry.

The foregoing describes only some embodiments of the present invention, and modifications and/or changes can be made thereto without departing from the scope and spirit of the invention, the embodiments being illustrative and not restrictive.

The system 100 can also be used to provide authorised access to lighting systems, building control devices, exterior or remote devices such as air compressors and so on. The concept of "secure access" is thus extendible beyond mere access to restricted physical areas.

What is claimed is:

1. A system for providing secure access to a controlled item, the system comprising:
   a database of biometric signatures;
   a transmitter sub-system comprising:
      a biometric sensor for receiving a biometric signal;
      means for matching the biometric signal against members of the database of biometric signatures to thereby output an accessibility attribute; and
      means for emitting a secure access signal conveying information dependent upon said accessibility attribute; and
   a receiver sub-system comprising:
   means for receiving the transmitted secure access signal; and
   means for providing conditional access to the controlled item dependent upon said information,
   wherein the transmitter sub-system further comprises means for populating the data base of biometric signatures, the population means comprising:
      means for receiving a series of entries of the biometric signal, said series being characterised according to at least one of the number of said entries and a duration of each said entry;
      means for mapping said series into an instruction; and
      means for populating the data base according to the instruction,
   wherein the controlled item is one of: a locking mechanism of a physical access structure or an electronic lock on an electronic computing device.

2. The system according to claim 1, further comprising:
   means for providing a signal for directing input of the series of entries of the biometric signal;
   means for incorporating into the secure access signal an identification field identifying the biometric signal if the signal matches a member of the database; and
   means for constructing an audit trail of biometric signals provided to the biometric sensor for the purpose of accessing the controlled item.

3. The system according to claim 1, wherein the database of biometric signatures comprises signatures in at least one of a system administrator class, a system user class, and a duress class, the accessibility attribute preferably comprising:
   an access attribute if the biometric signal matches a member of the database of biometric signatures;
   a duress attribute if the biometric signal matches a member of the database of biometric signatures and said member belongs to the duress class; and
   an alert attribute if the biometric signal does not match a member of the database of biometric signatures.

4. The system according to claim 1, wherein the biometric sensor is responsive to one of voice, retinal pattern, iris pattern, face pattern, and palm configuration, and/or the database of biometric signatures is located in at least one of the transmitter sub-system and the receiver sub-system.

5. The system according to claim 1, wherein said conditional access comprises one of:
   provision of access to the controlled item if the accessibility attribute comprises an access attribute:
   provision of access to the controlled item and sounding of an alert if the accessibility attribute comprises a duress attribute; and
   denial of access to the controlled item and sounding of an alert if the accessibility attribute comprises an alert attribute.

6. The system as claimed in claim 1, wherein:
   the biometric sensor is for authenticating the identity of a user;
   the means for emitting comprises a transmitter for transmitting information capable of granting more than two types of access to the controlled item using a secure wireless signal dependent upon a request from the user and the authentication of the user identity; and
   the system further comprising a control panel for receiving the information and for providing the secure access requested.

7. The system according to claim 6, wherein the control panel includes a converter for receiving the secure wireless signal and for outputting the information, and/or the biometric sensor authenticates the identity of the user by comparing a biometric input from the user with a biometric signature for the user in a biometric database, and/or the biometric sensor, the biometric database, and the transmitter are located in a remote fob.

8. The system according to claim 7, wherein the secure wireless signal comprises an RF carrier and a rolling code, and the converter preferably converts the rolling code to the Wiegand protocol.

9. A transmitter sub-system for operating in a system for providing secure access to a controlled item, wherein the transmitter sub-system comprises:
   a biometric sensor for receiving a biometric signal;

means for matching the biometric signal against members of a database of biometric signatures to thereby output an accessibility attribute; and means for emitting a secure access signal conveying said information dependent upon said accessibility attribute;

wherein the transmitter sub-system further comprises means for populating the database of biometric signatures, the populating means comprising:

means for receiving a series of entries of the biometric signal, said series being characterised according to at least one of the number of said entries and a duration of each said entry;

means for mapping said series into an instruction; and means for populating the database according to the instruction, wherein the controlled item is one of: a locking mechanism of a physical access structure or an electronic lock on an electronic computing device.

10. A method for providing secure access to a controlled item in a system comprising a database of biometric signatures, a transmitter sub-system comprising a biometric sensor for receiving a biometric signal, and means for emitting a secure access signal capable of granting more than two types of access to the controlled item, and a receiver sub-system comprising means for receiving the transmitted secure access signal, and means for providing conditional access to the controlled item dependent upon information in said secure access signal, the method comprising the steps of:

populating the database of biometric signatures by:
  receiving a series of entries of the biometric signal;
  determining at least one of the number of said entries and a duration of each said entry;
  mapping said series into an instruction; and
  populating the database according to the instruction;
receiving a biometric signal;
matching the biometric signal against members of the database of biometric signatures to thereby output an accessibility attribute;
emitting a secure access signal conveying information dependent upon said accessibility attribute; and
providing conditional access to the controlled item dependent upon said information,
wherein the controlled item is one of: a locking mechanism of a physical access structure or an electronic lock on an electronic computing device.

11. The method according to claim 10, wherein the step of populating the database of biometric signatures further comprises the step of enrolling a biometric signature into the database of biometric signatures comprising the steps of:
  receiving a biometric signal; and
  enrolling the biometric signal as an administrator signature if the database of biometric signatures is empty.

12. The method according to claim 11, wherein the step of enrolling the biometric signature further comprises receiving another biometric signal to confirm the enrolling of the biometric signal as an administrator signature, and is preferably performed dependent upon generation of a feedback signal adapted to direct provision of at least one of the biometric signal and the other biometric signal.

13. A non-transitory computer readable storage medium for storing a computer program comprising instructions, which when executed by processors causes the processors to perform the steps of the method of claim 10.

* * * * *